US012659324B1

(12) United States Patent
Warner et al.

(10) Patent No.: US 12,659,324 B1
(45) Date of Patent: Jun. 16, 2026

(54) SYSTEMS AND METHODS FOR CREATING AND PRESENTING RELATIONSHIPS WITHIN INFORMATION TECHNOLOGY DATA

(71) Applicant: State Farm Mutual Automobile Insurance Company, Bloomington, IL (US)

(72) Inventors: Andrew Warner, Peachtree Corners, GA (US); Sudha Kalyanasundaram, Cumming, GA (US); Faith A. Brumfield, Johns Creek, GA (US); Ashish Desai, Suwanee, GA (US); Steven Stiles, Scottsdale, AZ (US); Amanda Yang, Snellville, GA (US); Yolanda Brumfield, Johns Creek, GA (US); Alexander R. Schneck, Roswell, GA (US); Cesar B. Acosta, Atlanta, GA (US); Christopher Chickoree, Atlanta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 477 days.

(21) Appl. No.: 17/342,240

(22) Filed: Jun. 8, 2021

(51) Int. Cl.
*H04L 9/40* (2022.01)
*G06N 3/08* (2023.01)

(52) U.S. Cl.
CPC ........... *H04L 63/1425* (2013.01); *G06N 3/08* (2013.01); *H04L 63/1416* (2013.01); *H04L 63/20* (2013.01)

(58) Field of Classification Search
None
See application file for complete search history.

(56) References Cited

U.S. PATENT DOCUMENTS 5,592,600 A    1/1997  De Pauw et al.
6,535,227 B1   3/2003  Fox et al.
(Continued)

FOREIGN PATENT DOCUMENTS

WO    2013185166 A1   12/2013
WO    2017069548 A1   4/2017
WO    2020206204 A1   10/2020

OTHER PUBLICATIONS

Zhang et al.; A Machine Learning-based Approach for Automated Vulnerability Remediation Analysis; 2020; retrieved from the Internet https://ieeexplore.ieee.org/abstract/document/9162309; pp. 1-9. (Year: 2020).*

(Continued)

*Primary Examiner* — Michael W Chao
(74) *Attorney, Agent, or Firm* — Armstrong Teasdale LLP

(57)    ABSTRACT

In one aspect, a computing system including a processor in communication with at least one memory may be provided. The processor may be configured to: (i) connect to a plurality of data sources in a nodal network including a plurality of nodes; (ii) determine, for each node of the plurality of nodes, a relationship to at least one other node of the plurality of nodes; (iii) generate, based upon the determined relationships between nodes, a mapping including each node of the plurality of nodes and each relationship of the determined relationships; (iv) analyze each relationship of the determined relationships to determine at least one threat; (v) determine at least one solution for the at least one threat; and/or (vi) cause display of the at least one threat and the at least one solution.

20 Claims, 10 Drawing Sheets

(56)                    References Cited

U.S. PATENT DOCUMENTS

| | | | |
|---|---|---|---|
| 6,836,893 | B2 | 12/2004 | Pinard |
| 7,757,271 | B2 | 7/2010 | Amdur et al. |
| 8,285,822 | B2 | 10/2012 | K. |
| 8,583,678 | B2 | 11/2013 | Vainer et al. |
| 8,640,086 | B2 | 1/2014 | Bonev et al. |
| 8,674,993 | B1 | 3/2014 | Fleming et al. |
| 8,738,414 | B1 | 5/2014 | Nagar et al. |
| 8,769,412 | B2 | 7/2014 | Gill et al. |
| 8,930,395 | B2 | 1/2015 | Sharma et al. |
| 8,938,435 | B2 | 1/2015 | Swaminathan et al. |
| 9,087,361 | B2 | 7/2015 | Mirra et al. |
| 9,276,774 | B2 | 3/2016 | Manser |
| 9,311,082 | B2 | 4/2016 | Bonev et al. |
| 9,383,900 | B2 | 7/2016 | Flores et al. |
| 9,411,557 | B1 | 8/2016 | Cartey et al. |
| 9,544,192 | B2 | 1/2017 | Ruggeri |
| 9,652,559 | B2 | 5/2017 | Byrne et al. |
| 9,876,801 | B1 | 1/2018 | Scott et al. |
| 9,935,851 | B2 | 4/2018 | Gandham et al. |
| 9,967,158 | B2 | 5/2018 | Pang et al. |
| 10,013,717 | B2 | 7/2018 | Posch et al. |
| 10,116,530 | B2 | 10/2018 | Yadav et al. |
| 10,116,531 | B2 | 10/2018 | Alizadeh Attar et al. |
| 10,129,237 | B2 | 11/2018 | Cashman et al. |
| 10,176,445 | B2 | 1/2019 | Venna et al. |
| 10,222,965 | B1 | 3/2019 | Dennis et al. |
| 10,248,391 | B2 | 4/2019 | Heiss |
| 10,305,758 | B1 * | 5/2019 | Bhide ................. G06F 11/3409 |
| 10,320,630 | B2 | 6/2019 | Gandham et al. |
| 10,482,542 | B1 | 11/2019 | Jain |
| 10,496,468 | B2 | 12/2019 | Gefen et al. |
| 10,505,827 | B2 | 12/2019 | Parandehgheibi et al. |
| 10,516,585 | B2 | 12/2019 | Parandehgheibi et al. |
| 10,528,897 | B2 | 1/2020 | Labat et al. |
| 10,528,958 | B2 | 1/2020 | Yang et al. |
| 10,534,518 | B2 | 1/2020 | Ranganathan et al. |
| 10,594,542 | B2 | 3/2020 | Jeyakumar et al. |
| 10,623,282 | B2 | 4/2020 | Deen et al. |
| 10,628,015 | B2 | 4/2020 | Johnson et al. |
| 10,657,482 | B2 | 5/2020 | Kurjanowicz et al. |
| 10,666,494 | B2 | 5/2020 | Zafer et al. |
| 10,693,903 | B2 | 6/2020 | Linde et al. |
| 10,721,266 | B1 * | 7/2020 | Herman-Saffar ... H04L 63/1441 |
| 10,728,120 | B2 | 7/2020 | Beyer |
| 10,748,226 | B2 | 8/2020 | Van De Sande et al. |
| 10,761,687 | B2 | 9/2020 | Fletcher et al. |
| 10,769,159 | B2 | 9/2020 | Lyons et al. |
| 10,795,909 | B1 | 10/2020 | Bond et al. |
| 10,797,973 | B2 | 10/2020 | Parandehgheibi et al. |
| 10,802,698 | B1 | 10/2020 | Draper et al. |
| 10,818,053 | B2 | 10/2020 | Pushpoth et al. |
| 11,074,511 | B2 * | 7/2021 | Patil ..................... G06Q 30/02 |
| 11,159,555 | B2 * | 10/2021 | Hadar ................. H04L 63/1433 |
| 11,533,324 | B2 * | 12/2022 | Walsh .................... G06N 5/022 |
| 11,550,560 | B2 * | 1/2023 | Yang ......................... G06F 9/547 |
| 11,727,142 | B2 * | 8/2023 | James Stephen ... H04L 41/0627 |
| | | | 726/26 |
| 11,805,140 | B2 * | 10/2023 | Baidya ..................... G06N 5/01 |
| 11,829,471 | B2 * | 11/2023 | Jin ......................... G06F 21/554 |
| 11,847,214 | B2 * | 12/2023 | Dichiu ................. G06F 3/0673 |
| 11,922,162 | B2 * | 3/2024 | A ........................ H04L 41/0856 |
| 11,949,698 | B1 * | 4/2024 | Vincent .............. H04L 63/1416 |
| 11,960,610 | B2 * | 4/2024 | Hercock ............... G06F 21/577 |
| 12,045,343 | B2 * | 7/2024 | Coull ..................... G06N 20/00 |
| 12,088,608 | B2 * | 9/2024 | Konda ..................... G06N 3/08 |
| 12,120,134 | B2 * | 10/2024 | Rogers ................... G06N 20/00 |
| 2002/0113816 | A1 | 8/2002 | Mitchell et al. |
| 2003/0028859 | A1 | 2/2003 | Street et al. |
| 2006/0080656 | A1 * | 4/2006 | Cain ......................... G06F 8/65 |
| | | | 434/118 |
| 2007/0150562 | A1 | 6/2007 | Stull et al. |
| 2007/0214179 | A1 | 9/2007 | Hoang |
| 2008/0072321 | A1 * | 3/2008 | Wahl ..................... H04L 63/14 |
| | | | 726/22 |

| | | | |
|---|---|---|---|
| 2008/0163063 | A1 | 7/2008 | Bonev et al. |
| 2008/0301765 | A1 * | 12/2008 | Nicol ...................... H04L 63/20 |
| | | | 726/1 |
| 2009/0031239 | A1 | 1/2009 | Coleran et al. |
| 2010/0192212 | A1 * | 7/2010 | Raleigh ................. H04M 15/49 |
| | | | 726/7 |
| 2010/0293112 | A1 | 11/2010 | Prahlad et al. |
| 2011/0126111 | A1 * | 5/2011 | Gill ........................ G06F 21/577 |
| | | | 715/736 |
| 2012/0090028 | A1 * | 4/2012 | Lapsley .............. H04L 63/1416 |
| | | | 704/E21.001 |
| 2014/0189870 | A1 * | 7/2014 | Singla .................. G06F 21/6227 |
| | | | 726/23 |
| 2014/0280909 | A1 * | 9/2014 | Gosink .................. G06Q 10/06 |
| | | | 709/224 |
| 2015/0066933 | A1 | 3/2015 | Kolodziej et al. |
| 2015/0074612 | A1 | 3/2015 | Antipa |
| 2015/0113024 | A1 | 4/2015 | Howe |
| 2015/0120521 | A1 | 4/2015 | Howe |
| 2015/0332054 | A1 * | 11/2015 | Eck ...................... H04L 63/1416 |
| | | | 726/25 |
| 2016/0134588 | A1 * | 5/2016 | Falkowitz ........... H04L 63/1441 |
| | | | 726/11 |
| 2016/0232370 | A1 | 8/2016 | Rissanen et al. |
| 2016/0269249 | A1 * | 9/2016 | Maes ...................... H04L 41/22 |
| 2016/0323693 | A1 | 11/2016 | Rathod |
| 2016/0328668 | A1 | 11/2016 | B'Far et al. |
| 2016/0357424 | A1 | 12/2016 | Pang et al. |
| 2016/0359915 | A1 * | 12/2016 | Gupta ..................... H04L 43/04 |
| 2017/0048266 | A1 * | 2/2017 | Hovor ................. H04L 63/1433 |
| 2017/0085446 | A1 * | 3/2017 | Zhong ..................... H04L 41/22 |
| 2017/0222873 | A1 | 8/2017 | Lee et al. |
| 2017/0279696 | A1 * | 9/2017 | Vasseur ................. H04L 41/142 |
| 2018/0004948 | A1 * | 1/2018 | Martin ................ H04L 63/1425 |
| 2018/0013650 | A1 * | 1/2018 | Khanal ................... H04L 69/16 |
| 2018/0144243 | A1 * | 5/2018 | Hsieh ...................... G06F 11/30 |
| 2018/0159887 | A1 * | 6/2018 | DiGiambattista ..... G06F 21/577 |
| 2018/0189416 | A1 | 7/2018 | Lee et al. |
| 2018/0197183 | A1 | 7/2018 | Mcbennett |
| 2018/0276254 | A1 | 9/2018 | Whitlock et al. |
| 2018/0295154 | A1 * | 10/2018 | Crabtree ............. H04L 63/1433 |
| 2019/0018904 | A1 | 1/2019 | Russell et al. |
| 2019/0034254 | A1 * | 1/2019 | Nataraj ............... G06F 11/0709 |
| 2019/0036963 | A1 * | 1/2019 | Ahad ...................... H04L 43/04 |
| 2019/0098032 | A1 * | 3/2019 | Murphey .............. G06F 9/4498 |
| 2019/0121979 | A1 * | 4/2019 | Chari ..................... G06F 21/566 |
| 2019/0342324 | A1 * | 11/2019 | Nawy .................. G06F 16/2228 |
| 2020/0011784 | A1 | 1/2020 | Chalumuri et al. |
| 2020/0066012 | A1 | 2/2020 | Pushpoth et al. |
| 2020/0137104 | A1 * | 4/2020 | Hassanzadeh ...... H04L 63/1433 |
| 2020/0169565 | A1 * | 5/2020 | Badawy ............... G06F 21/552 |
| 2020/0211103 | A1 | 7/2020 | Searson et al. |
| 2020/0241711 | A1 | 7/2020 | Pandian et al. |
| 2020/0259700 | A1 * | 8/2020 | Bhalla .................... H04L 41/16 |
| 2020/0287807 | A1 | 9/2020 | Zhong et al. |
| 2020/0293305 | A1 * | 9/2020 | Yang ................... H04L 63/1408 |
| 2020/0293912 | A1 | 9/2020 | Williams et al. |
| 2020/0293970 | A1 * | 9/2020 | Hwang ............. G06Q 10/0635 |
| 2020/0303059 | A1 | 9/2020 | Trindade Rodrigues et al. |
| 2020/0334237 | A1 | 10/2020 | Yousaf et al. |
| 2020/0412767 | A1 * | 12/2020 | Crabtree ............. H04L 63/1441 |
| 2021/0152574 | A1 * | 5/2021 | Maida ................. H04L 63/1425 |
| 2024/0195815 | A1 * | 6/2024 | Yang ..................... G06F 18/24 |
| 2024/0372889 | A1 * | 11/2024 | Beck ..................... H04L 51/224 |
| 2025/0045391 | A1 * | 2/2025 | Agranonik .............. G06N 3/08 |
| 2025/0227117 | A1 * | 7/2025 | Shahbaz ............. H04L 63/1458 |

OTHER PUBLICATIONS

Zhang et al.; A machine Learning-based Approach for Automated Vulnerability Remediation Analysis; 2020; retrieved from the internet https://ieeexplore.ieee.org/abstract/document/9162309; pp. 1-9, as printed. (Year: 2020).*

* cited by examiner

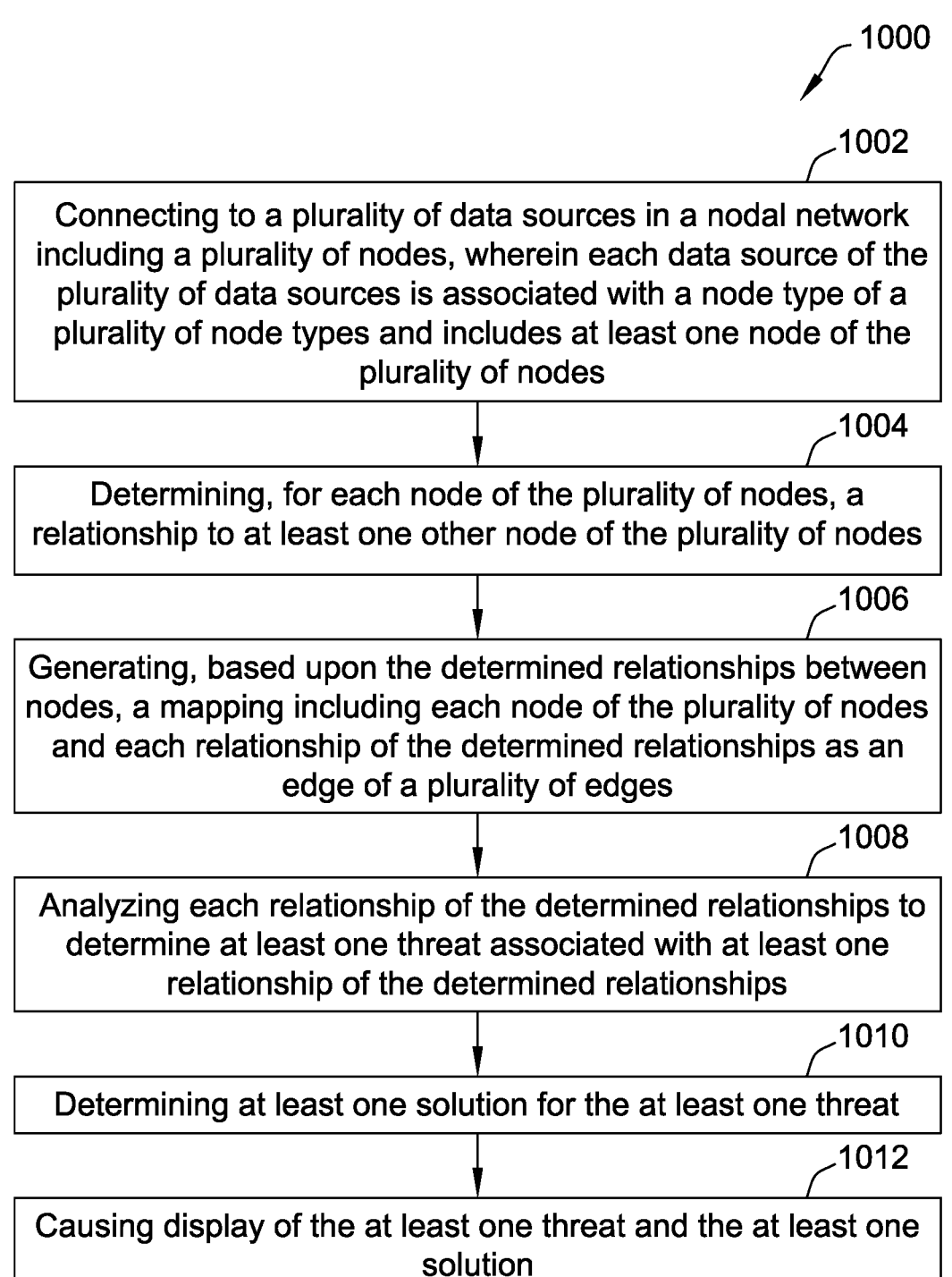

1000

1002

Connecting to a plurality of data sources in a nodal network including a plurality of nodes, wherein each data source of the plurality of data sources is associated with a node type of a plurality of node types and includes at least one node of the plurality of nodes

1004

Determining, for each node of the plurality of nodes, a relationship to at least one other node of the plurality of nodes

1006

Generating, based upon the determined relationships between nodes, a mapping including each node of the plurality of nodes and each relationship of the determined relationships as an edge of a plurality of edges

1008

Analyzing each relationship of the determined relationships to determine at least one threat associated with at least one relationship of the determined relationships

1010

Determining at least one solution for the at least one threat

1012

Causing display of the at least one threat and the at least one solution

FIG. 10

SYSTEMS AND METHODS FOR CREATING AND PRESENTING RELATIONSHIPS WITHIN INFORMATION TECHNOLOGY DATA

FIELD OF THE DISCLOSURE

The present disclosure relates to systems and methods for analyzing data, and more specifically, to systems and methods for creating relationships between information technology (IT) data, and presenting said relationships on an interactive user interface such that an end user is able to easily see what IT assets the end user is responsible for and whether those assets are in compliance with data security protocols, and if not, what steps need to be taken to achieve compliance.

BACKGROUND

Modern solutions for data analytics often include a plurality of different software solutions implemented by a plurality of different providers. These modern solutions make it difficult for a user/client to gain a holistic understanding of data from a plurality of different data sources. Further, known solutions require an increased amount of time to find data from the different software solutions and take action in order to respond to the found data.

For example, in the area of information technology (IT), many different computer software solutions may be used as "authoritative" data sources or places to take action in order to address data security issues. One of the problems raised by these many different so called solutions is that it is oftentimes impossible to get a single, holistic understanding of the IT assets deployed, the data security threats associated therewith, and whether the assets are in compliance with established protocols. These known systems fail to provide this information in a single location, and thus, these systems merely increase the amount of time it takes to find data and take action in order to ensure compliance. The systems and methods described herein address at least these known failures of these known systems.

BRIEF SUMMARY

The present embodiments may relate to, inter alia, systems and methods for analyzing data, and more specifically, to systems and methods for creating relationships between information technology (IT) data, and presenting said relationships on an interactive user interface such that an end user is able to easily see what IT assets the end user is responsible for and whether those assets are in compliance with data security protocols, and if not, what steps need to be taken to achieve compliance. The present embodiments may provide a holistic solution for analyzing risk and/or compliance data of deployed IT assets within a company or other entity, while also determining and/or automatically implementing solutions to ensure that the IT assets include controls that are in compliance with certain protocols or policies promulgated by the company or other entity. Further, the present embodiments may provide artificial intelligence solutions for analyzing risk and/or compliance data such that, for example, a neural network is trained regarding recognizing risks/non-compliances with data security protocols and/or implementing solutions such that the system provided herein better recognizes risks/non-compliances with data security protocols and/or implements solutions over time (e.g., to achieve compliance with data security protocols).

In one aspect, a computing system including a processor in communication with at least one memory may be provided. The processor may be configured to: (i) connect to a plurality of data sources in a nodal network including a plurality of nodes, wherein each data source of the plurality of data sources is associated with a node type of a plurality of node types and includes at least one node of the plurality of nodes; (ii) determine, for each node of the plurality of nodes, a relationship to at least one other node of the plurality of nodes; (iii) generate, based upon the determined relationships between nodes, a mapping including each node of the plurality of nodes and each relationship of the determined relationships as an edge of a plurality of edges; (iv) analyze each relationship of the determined relationships to determine at least one threat associated with at least one relationship of the determined relationships; (v) determine at least one solution for the at least one threat; and/or (vi) cause display of the at least one threat and the at least one solution. The computing system may include additional, less, or alternate actions, including those discussed elsewhere herein.

In another aspect, a computer-implemented method implemented by a computing system including a processor in communication with at least one memory may be provided. The method may include: (i) connecting to a plurality of data sources in a nodal network including a plurality of nodes, wherein each data source of the plurality of data sources is associated with a node type of a plurality of node types and includes at least one node of the plurality of nodes; (ii) determining, for each node of the plurality of nodes, a relationship to at least one other node of the plurality of nodes; (iii) generating, based upon the determined relationships between nodes, a mapping including each node of the plurality of nodes and each relationship of the determined relationships as an edge of a plurality of edges; (iv) analyzing each relationship of the determined relationships to determine at least one threat associated with at least one relationship of the determined relationships; (v) determining at least one solution for the at least one threat; and/or (vi) causing display of the at least one threat and the at least one solution. The method may include additional, less, or alternate actions, including those discussed elsewhere herein.

In yet another aspect, at least one non-transitory computer-readable storage media having computer-executable instructions embodied thereon may be described. The instructions, when executed by a computing system including at least one processor in communication with at least one memory device, may cause the at least one processor to: (i) connect to a plurality of data sources in a nodal network including a plurality of nodes, wherein each data source of the plurality of data sources is associated with a node type of a plurality of node types and includes at least one node of the plurality of nodes; (ii) determine, for each node of the plurality of nodes, a relationship to at least one other node of the plurality of nodes; (iii) generate, based upon the determined relationships between nodes, a mapping including each node of the plurality of nodes and each relationship of the determined relationships as an edge of a plurality of edges; (iv) analyze each relationship of the determined relationships to determine at least one threat associated with at least one relationship of the determined relationships; (v) determine at least one solution for the at least one threat; and/or (vi) cause display of the at least one threat and the at least one solution. The computer-readable storage media may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 10 illustrates a flow chart of an exemplary computer-implemented process that may be carried out by the computing system illustrated in FIG. 1.

Figure 1:
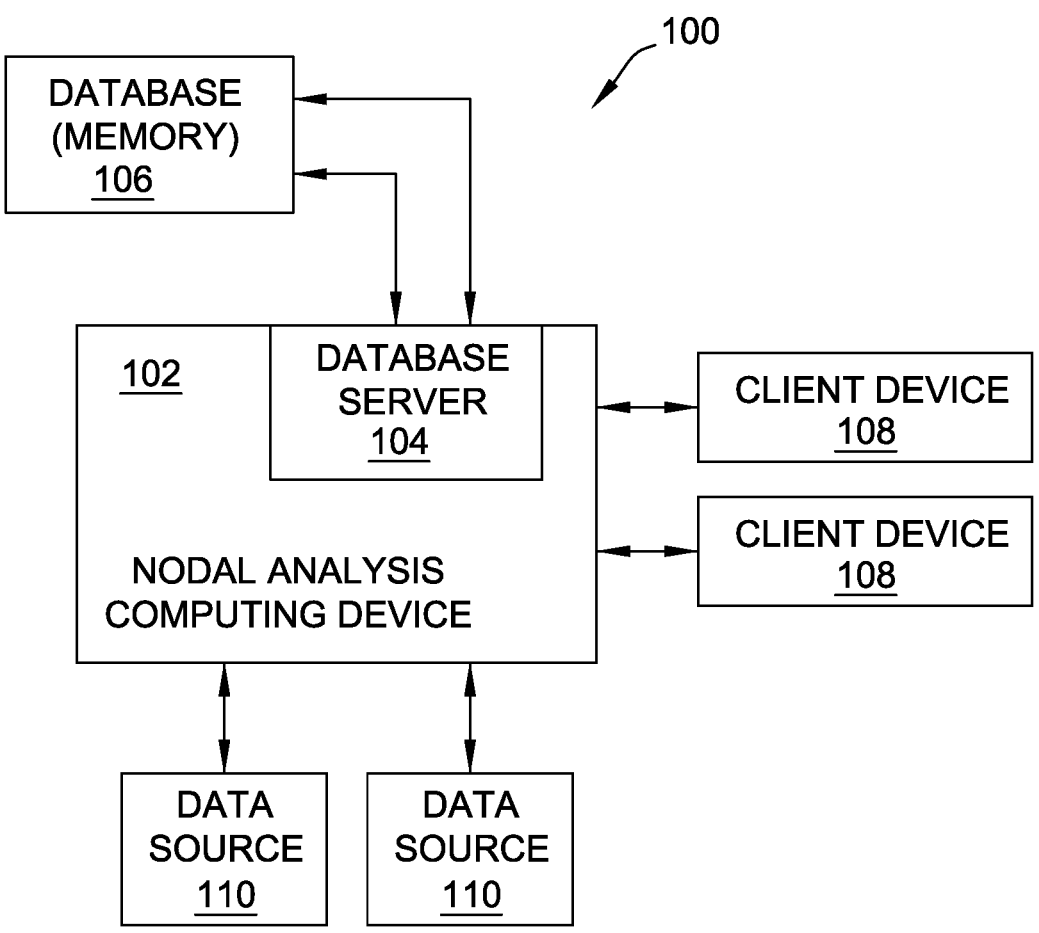
FIG. 1 illustrates an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for creating and presenting relationships within information technology data, and more specifically, to systems and methods for creating relationships between information technology (IT) data, and presenting said relationships on an interactive user interface such that an end user is able to easily see what IT assets the end user is responsible for and whether those assets are in compliance with data security protocols, and if not, what steps need to be taken to achieve compliance. The present embodiments may generate and provide high-level, at-a-glance (e.g., in a single diagram), personalized views of their IT data by providing better navigation capabilities (e.g., amongst nodes and/or edges, as described herein) and more actionable information (e.g., recommended and/or automatically implemented solutions to achieve compliance) via graph and table views to reduce non-compliance and increase compliance. In other words, the present embodiments may include generating an all-in-one diagram including icons (e.g., links, nodes, edges, etc.) that can be selected by a user in order to access more data. Accordingly, the present embodiments may provide a limited footprint of a diagram (e.g., only showing data accessible and/or important to a user) while also including a summary of all data that is relevant to a user.

The present embodiments may provide a holistic solution for analyzing risk and/or compliance data of deployed IT assets within a company or other entity, while also determining and/or automatically implementing solutions to ensure that the IT assets include controls that are in compliance with certain protocols or policies promulgated by the company or other entity. Further, the present embodiments may provide artificial intelligence solutions for analyzing risk and/or compliance data associated with IT assets such that, for example, a neural network may be trained to recognize when an IT asset having certain controls is not in compliance with policies in place to ensure data security, and thus, an identified solution is recommended for implementation and/or automatically implemented to address the risk associated with the non-compliance.

The systems and methods described herein include a nodal analysis (NA) computing device that has at least one processor. The exemplary NA computing device may be part of a nodal analysis (NA) computing system that may be connected to and may identify a plurality of data sources in a network wherein each data source is associated with a node type. In an exemplary embodiment, the node types (e.g., representing IT data) may include (i) assets representing at least one computing device or software solution; (ii) policies or protocols representing data security compliance policies that may be enacted or followed by a company or other entity to reduce the risk of a data breach; (iii) controls associated with the assets that represent data security controls for reducing the risk of a data breach, and (iv) non-compliances representing defined non-compliances. In other words, a first plurality of nodes may include assets, a second plurality of nodes may represent policies, a third plurality of nodes may represent controls, and a fourth plurality of nodes may represent data security protocols (e.g., identifying risks). In an exemplary embodiment, the NA computing device may identify a plurality of data sources and assign each data source to one or more node types.

Further, the NA computing device may determine one or more relationships/connections between nodes. For example certain nodes of a first type may be connected to certain nodes of a second type, and so forth. Each relationship/connection between nodes may be referred to as an "edge" demonstrating the relationship/connection between nodes.

In the exemplary embodiment, the NA computing device is configured to analyze each relationship between nodes and generate a mapping including a representation of each node (e.g., as a circular shape) and each relationship (e.g., as an edge, such as a line connecting two or more nodes). The NA computing device may further determine one or more threats associated with one or more nodes and/or edges. Once a threat is determined, the NA computing device may be configured to determine one or more solutions to the threat. In some embodiments, the NA computing device may display an indication of the one or more solutions to the threat (e.g., a hyperlink to a software patch and/or to a download for a new version of software). In some embodiments, the NA computing device may automatically implement one or more identified solutions to the threat.

In the exemplary embodiment, the NA computing device may utilize machine learning and/or artificial intelligence techniques in order to improve threat mitigation and to automatically implement solutions for threat mitigation. For example, the NA computing device may create a first training set including a plurality of threats and train a neural network in a first stage using the training set. The NA computing device may then create a second training set including the first training set and non-threats that are incorrectly identified as threats after the first stage of training, and train the neural network in a second stage using the second training set.

Receiving Data from a Plurality of Data Sources

In the exemplary embodiment, the NA computing device is configured to connect to a variety of risk and compliance data sources, via different methods (e.g., API calls, flat file exports, etc.) in order to retrieve, combine, and display high-level personalized IT data from each source. Further the NA computing device may be configured to analyze at least a portion of the data in order to filter and display only data relevant to a particular user, while also only displaying data accessible by a user (e.g., for data security purposes). In some embodiments, the NA computing device is configured to analyze the received data in order to determine the data of the most value (e.g., the data that is most relevant for risk and compliance purposes) and display the data of most value to the user (e.g., in order to more efficiently communicate data to a user such that the results are simplified).

Analyzing and Configuring a Plurality of Data Types for Display in an Interactive Table The NA computing device may generate and provide table views for each data type in order to provide users with filterable and sortable tables to enable users are able to quickly find specific data. For example, an example table may include filterable data (e.g., enabling users to search data tables to refine data). As another example, an example table may include sortable data (e.g., enabling users to sort data tables in order to organize data.)

Analyzing and Configuring a Plurality of Data Types for Display in an Interactive Map The NA computing device may generate and provide a graph view which integrates all data types of IT data into a holistic and personalized graphical view (e.g., a full network view) of risk and compliance data. For example, the NA computing device may generate a customizable graph view (e.g., enabling users to customize their view via enabling/disabling data or node types and moving nodes), identify/determine which nodes and/or edges are exposing threats, are neutral, and/or are actively mitigating threats for a particular enterprise, and configure at least portions of the graph view such that the graph view allows users to select nodes or edges in order to view more information (e.g., via inputs at a client computing device).

In other words, in order to provide users with a high-level picture of all of their IT data, compliance thereof, the relationships between them, and where non-compliance may be present, the NA computing device may generate a graph view of IT data specific to a user. The graph view shows all of the user's IT data and its relationships on a single page via an interactive nodal network map. With this graph view a user can interact with the view (e.g., via a client device) in order to refine, reorganize, filter, and inspect nodes, and data thereof, to view more information about that specific node and data. The graph view allows users to disable and enable specific data types (e.g., nodes) by either removing or adding them to the graph view. This allows users to refine their nodal network map in order abstract the data.

A user can move nodes in order to reorganize their graph view, so that they can have the most concise and organized picture that they need for any given situation. In response to user selection of a node, the NA computing device may highlight all data associated with that node and display more information regarding that node. Accordingly, users can seek more detailed information about the specific data node and find launching points to more information or take action. Additionally, this provides users another way to refine and clarify their graph view picture.

Further, analysis is done on the relationships between data in order to determine and show users whether a relationship is currently compliant or non-compliant. By doing this, the NA computing device enables users to take action, in order to achieve compliance, quicker and more accurately. A user can select an edge (e.g., relationship between two data nodes) in order to understand the relationship between the two connected data nodes and compliance thereof, getting further understanding of what action is needed in order to mitigate risk effectively.

In the some embodiments, the NA computing device may utilize machine learning and/or artificial intelligence techniques in order to improve compliance and to automatically implement solutions for compliance. For example, the NA computing device may create a first training set including a plurality of threats and train a neural network in a first stage using the training set. The NA computing device may then create a second training set including the first training set and non-threats that are incorrectly identified as threats after the first stage of training, and train the neural network in a second stage using the second training set. Further, the NA computing device may automatically implement features described above (e.g, and elsewhere herein) in order to improve the computational efficiency and improve the user experience (e.g., automatically disable and enable specific data types, automatically implementing solutions in order to achieve compliance (e.g., instead of waiting for a user response/input at a client device), etc.).

At least one of the technical problems addressed by this system may include: (i) the inability of a computing device to integrate data from multiple IT data sources; (ii) the inability of a computing device to analyze data from multiple IT data sources to generate at least one of integrated data, personalized data, and easy-to-understand high-level data; (iii) the inability of a computing device to generate simplified displays in a table for a plurality of data types; (iv) the inability of a computing device to integrate a plurality of data types into a customizable and interactive mapping; and (v) the inability of a computing device to automatically implement a solution to a potential threat upon receipt of an input corresponding to an interactive mapping.

A technical effect of the systems and processes described herein may be achieved by performing at least one of the following steps: (i) connecting to a plurality of data sources in a nodal network including a plurality of nodes, wherein each data source of the plurality of data sources is associated with a node type of a plurality of node types (e.g., assets, representing at least one computing device, policies, representing company policies, controls, representing data security controls, and data security protocols, representing defined data security protocols). and includes at least one node of the plurality of nodes; (ii) determining, for each node of the plurality of nodes, a relationship to at least one other node of the plurality of nodes; (iii) generating, based upon the determined relationships between nodes, a mapping including each node of the plurality of nodes and each relationship of the determined relationships as an edge of a plurality of edges; (iv) analyzing each relationship of the determined relationships to determine at least one threat associated with at least one relationship of the determined relationships; (v) determining at least one solution for the at least one threat; and/or (vi) causing display of the at least one threat and the at least one solution.

The technical effect achieved by this system may be at least one of: (i) the ability of a computing device to integrate data from multiple IT data sources; (ii) the ability of a computing device to analyze data from multiple IT data sources to generate at least one of integrated data, personalized data, and easy-to-understand high-level data; (iii) the ability of a computing device to generate simplified displays in a table for a plurality of data types; (iv) the ability of a computing device to integrate a plurality of data types into a customizable and interactive mapping; and (v) the ability of a computing device to automatically implement a solution to a potential threat upon receipt of an input corresponding to an interactive mapping.

Exemplary Computer System

FIG. 1 depicts a simplified block diagram of an exemplary NA computer system 100. In the exemplary embodiment, system 100 may be used for creating relationships between information technology (IT) data, and presenting said relationships on an interactive user interface such that an end user is able to easily see what IT assets the end user is responsible for and whether those assets are in compliance with data security protocols, and if not, what steps need to be taken to achieve compliance. In the exemplary embodiment, system 100 may include an NA computing device 102 and a database server 104. NA computing device 102 may be in communication with one or more databases 106 (or other memory devices), client devices 108, and/or data sources 110.

In the exemplary embodiment, client devices 108 may be computers that include a web browser or a software application, which enables client devices 108 to access remote computer devices, such as NA computing device 102, using the Internet or other network. More specifically, client devices 108 may be communicatively coupled to NA computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Client devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A data source 110 (e.g., an IT data source) may be communicatively coupled with NA computing device 102. In some embodiments, data source 110 may be associated with, or is part of a computer network associated with an insurance provider, and/or in communication with the insurance provider's computer network (not shown). In other embodiments, data source 110 may be associated with another third party and is merely in communication with the insurance provider's network. That is, data source 110 may be associated with an insurance provider of the user. More specifically, data source 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Data source 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include data received from data sources 110. In the exemplary embodiment, database 106 may be stored remotely from NA computing device 102. In some embodiments, database 106 may be decentralized. In the exemplary embodiment, a user may access database 106 and/or NA computing device 102 via client device 108.

NA computing device 102 may be in communication with a plurality of client devices 108 and data sources 110 to determine threats and solutions for a particular enterprise. In some embodiments, NA computing device 102 may be associated with an insurance provider and/or may be in communication with the insurance provider's computer network (not shown). In other embodiments, NA computing device 102 may be associated with a third party and may merely be in communication with third party devices (e.g., client computing devices 108).

Exemplary Client Computing Device

Figure 2:
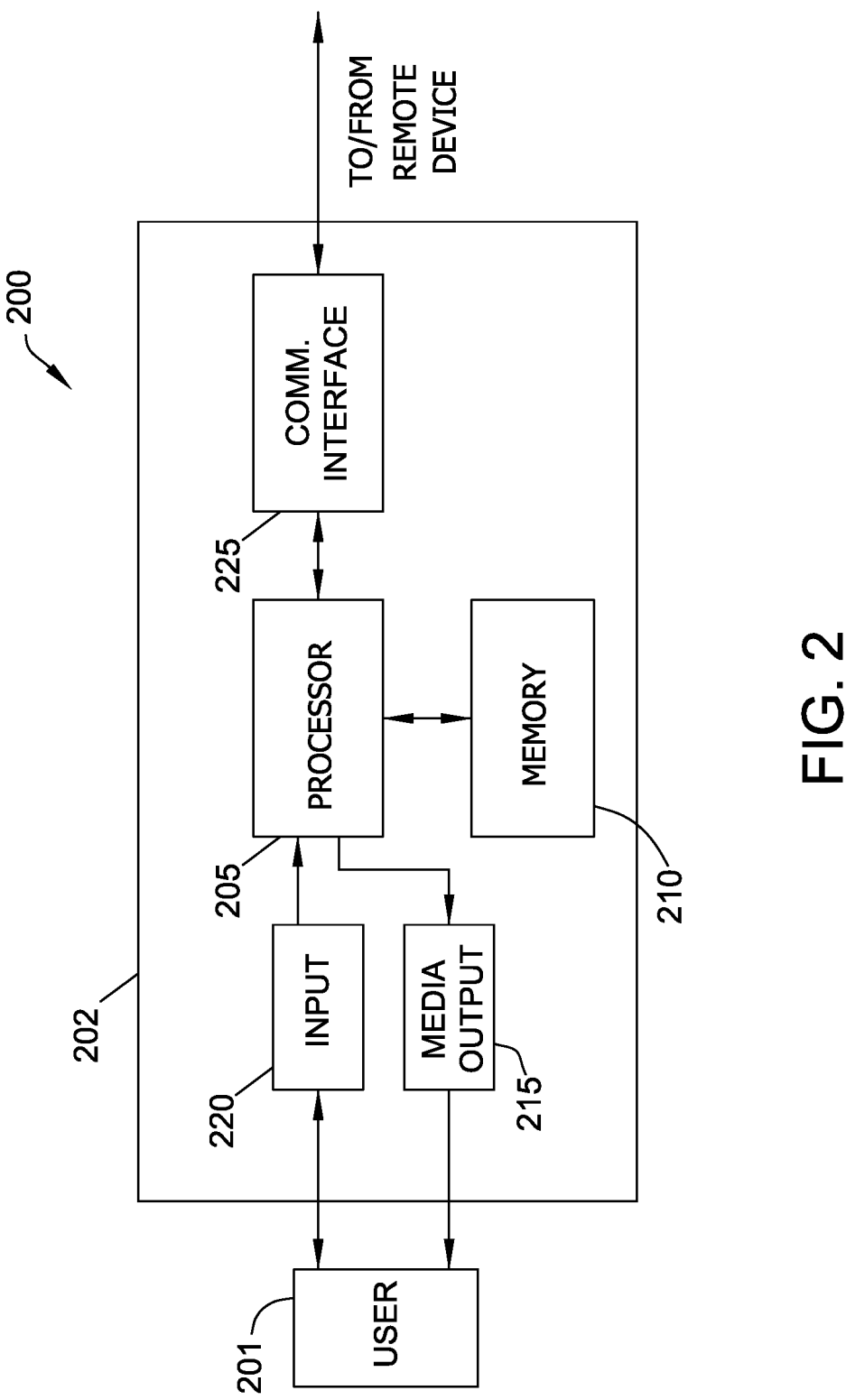
FIG. 2 illustrates an exemplary client computing device that may be used with the computer system illustrated in FIG. 1.

FIG. 2 depicts an exemplary client computing device 202 that may be used with the computer system illustrated in FIG. 1. Client computing device 202 may correspond to client computing device 108.

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, client computing device 202 may also include at least one media output component 215 (e.g., a graphical user interface (GUI)) for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as NA computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from NA computing device 102 for example, to view and modify a graph and/or table generated by NA computing device 102.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
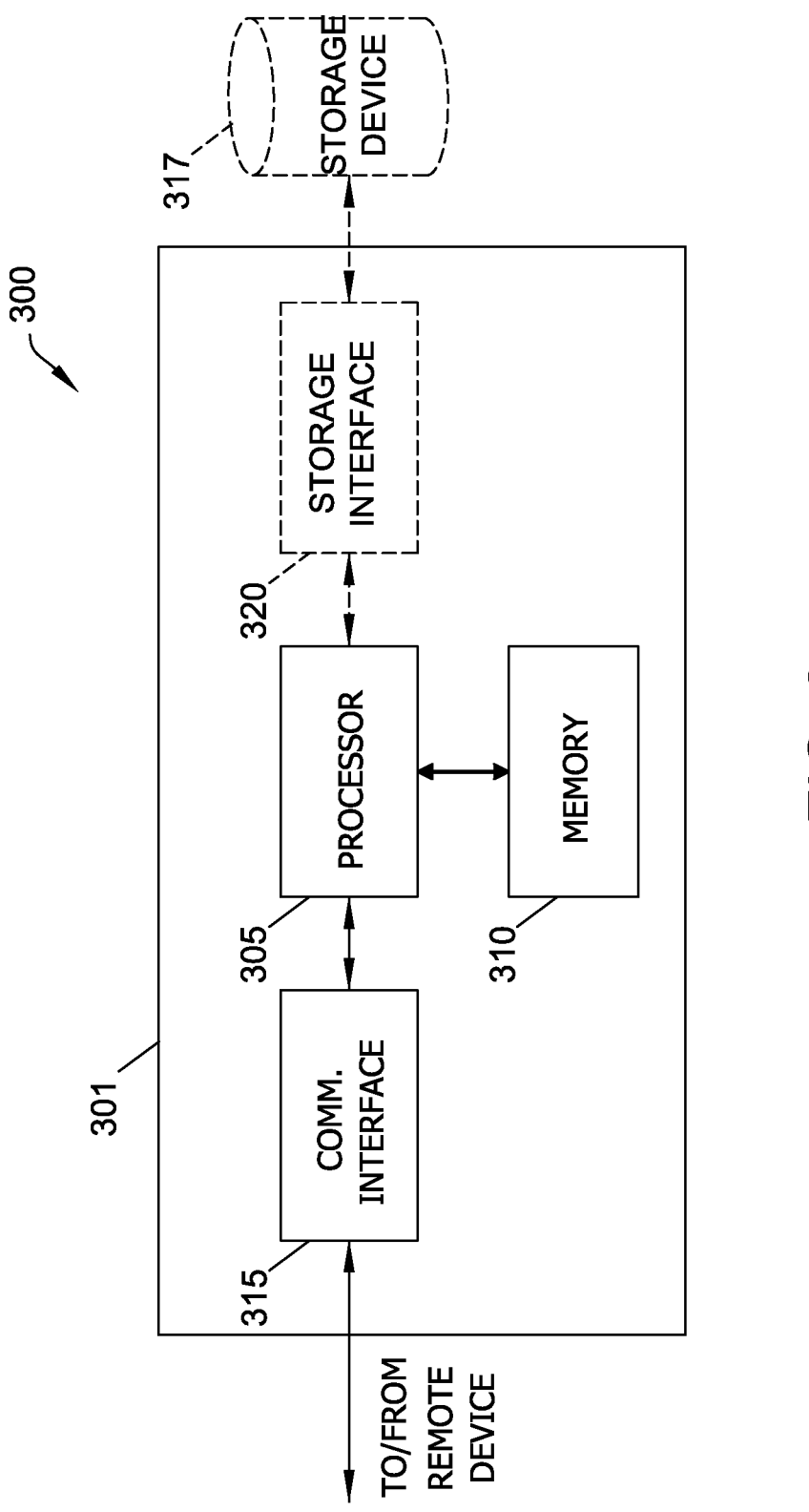
FIG. 3 illustrates an exemplary server system that may be used with the computer system illustrated in FIG. 1.

FIG. 3 illustrates an exemplary server system that may be used with the computer system illustrated in FIG. 1. Server system 301 may be, for example, NA computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

In exemplary embodiments, processor 305 may include and/or be communicatively coupled to one or more modules for implementing the systems and methods described herein.

Processor 305 may be operatively coupled to a communication interface 315 such that server system 301 is capable of communicating with client computing devices 108 and/or data sources 110 (all shown in FIG. 1), or another server system 301. For example, communication interface 315 may receive requests from client computing devices 108 via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Data Source Connections

Figures 4A, 4B:
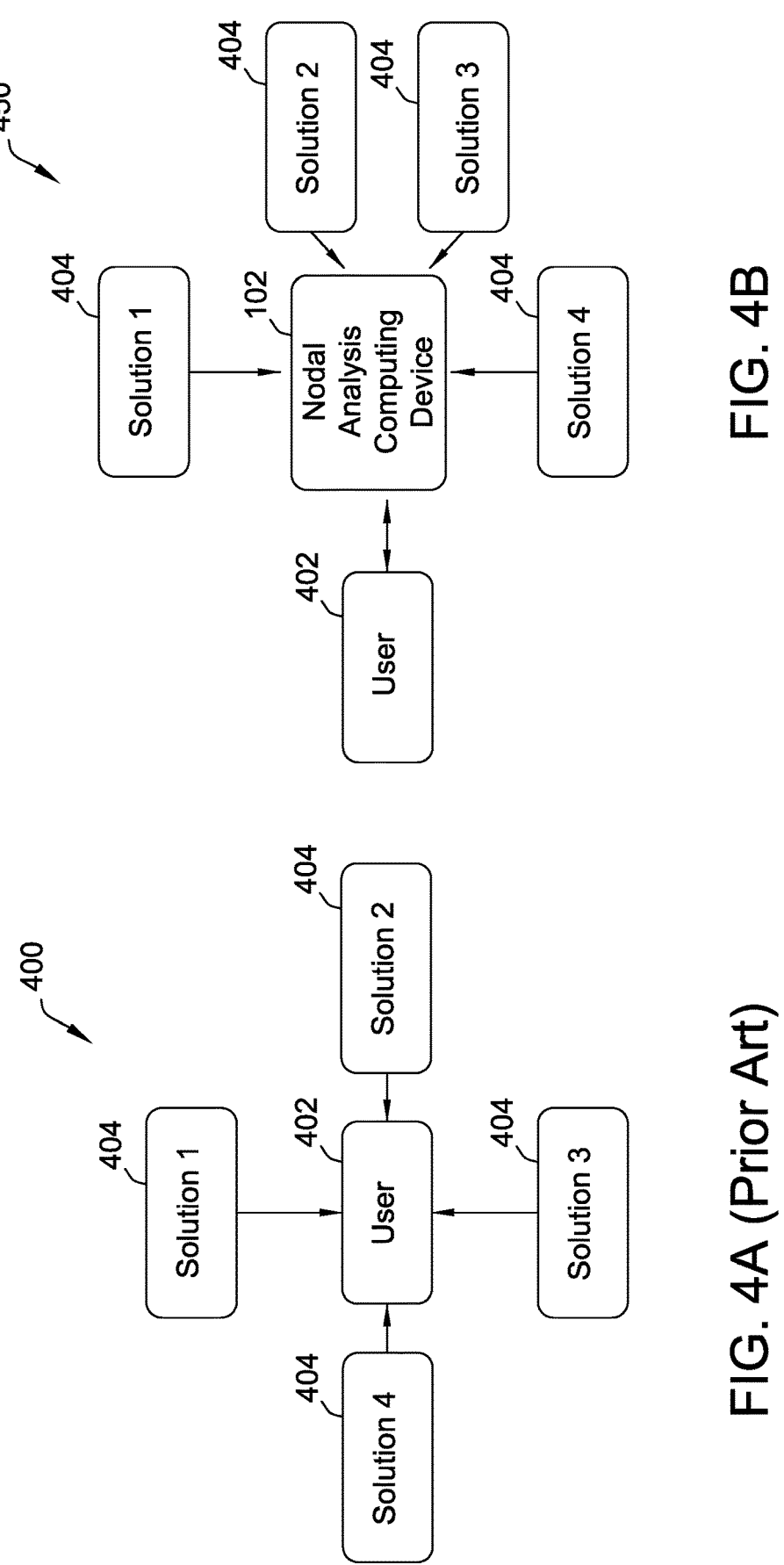
FIG. 4A illustrates exemplary connections to a plurality of data sources in a known system.
FIG. 4B illustrates an exemplary portion of the computing system illustrated in FIG. 1.

FIG. 4A illustrates an exemplary diagram 400 of prior art illustrating connections from a client computing device 402 (e.g., client computing device 108) to a plurality of data sources 404 (e.g., data sources 110).

Known systems may provide solutions by, for example, connecting data sources 404 and/or other third party applications directly to client computing device 402. These known systems are inefficient in providing solutions to potential threats because a user at client computing device 402 has to manually examine and sort through a burdensome amount of data being transmitted from, as examples, data sources 404 and/or other third party applications. Further, each of data sources 404 may provide a plurality of solutions to a user at client computing device 402, thereby burdening the user to make decisions due to the time required to sift through the data from each of data sources 404 and examining potential recommendations from each of data sources 404.

To solve this technical problem, as shown FIG. 4B in diagram 450 (e.g., exemplifying at least a portion of NA computing system 100), data sources 404 (e.g., data sources 110) are connected to NA computing device 102, and NA computing device 102 is connected to client computing device 402. Accordingly, as described herein, NA computing device 102 is configured to analyze data received from data sources 404 and provide a simplified output to a user at client computing device 402. Examples of simplified outputs may be found below with respect to FIGS. 5-8. In the example embodiment, simplified outputs generated by NA computing device 102 may include customizable (e.g., user-specific) graphical/mapped outputs that may include nodes and/or edges selectable by a user to view more information regarding the selected node and/or edge, and/or tabular outputs.

Exemplary Nodal Networks

Figure 5:
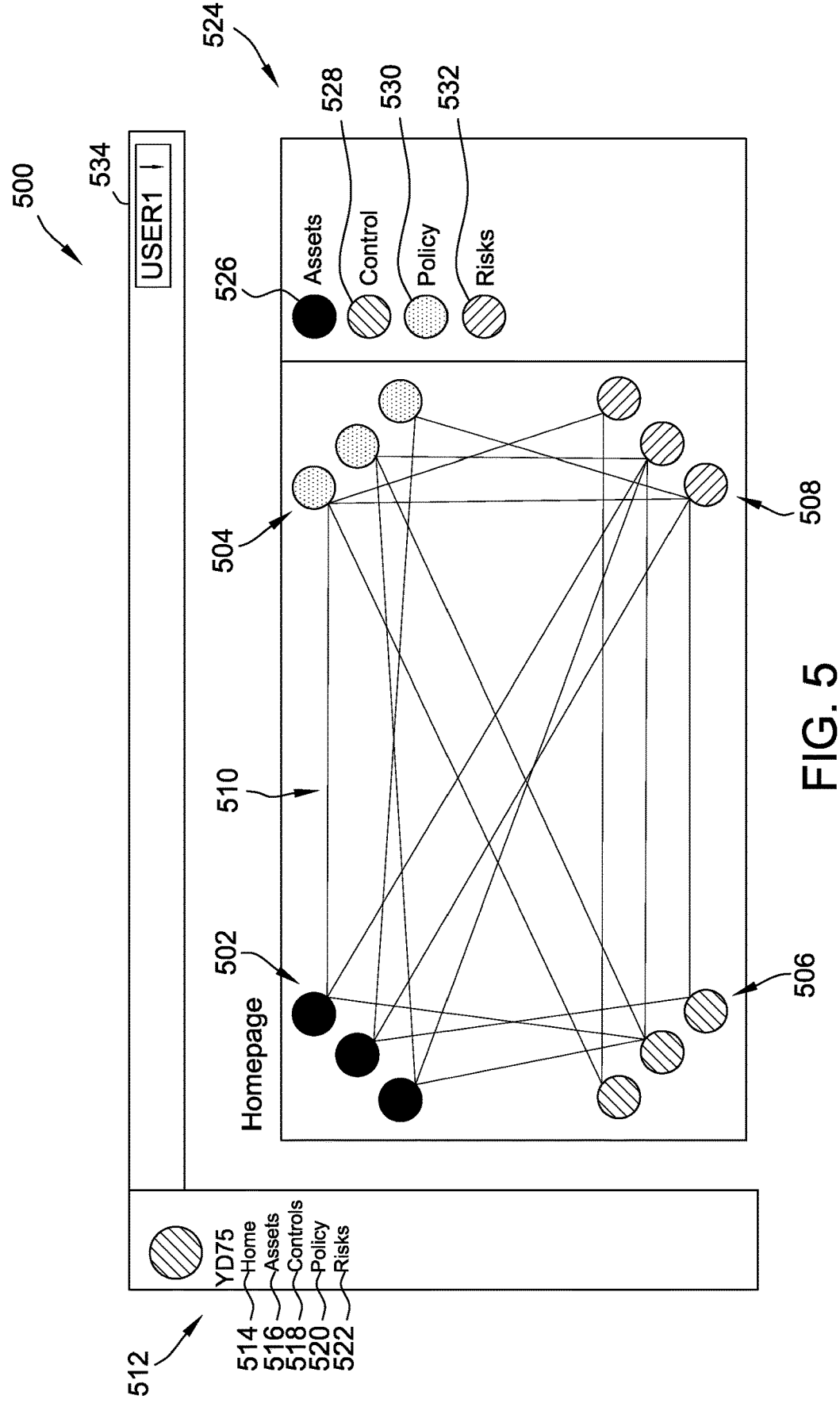
FIG. 5 illustrates an exemplary nodal network that may be generated by the computing system illustrated in FIG. 1.

FIG. 5 illustrates an exemplary nodal network map 500 that may be generated by NA computing device 102. Map 500 includes nodes 502 corresponding to a first node type, nodes 504 corresponding to a second node type, nodes 506 corresponding to a third node type, and nodes 508 corresponding to a fourth node type. Further, a plurality of edges 510 demonstrates relationships and/or associations between nodes 502-508.

In the example embodiment, each of nodes 502 corresponds to an asset (e.g., at least one computing device), each of nodes 504 corresponds to a policy (e.g., a company policy), each of nodes 506 corresponds to a control (e.g., a data security control), and each of nodes 508 corresponds to a data security protocol (e.g., a defined data security protocol stored in database 106). In some embodiments, NA computing device 102 is configured to automatically identify/determine each of nodes 502-508. In some embodiments, data may be inputted to NA computing device 102 (e.g., via client computing device 108) to define nodes 502-508.

Figure 9:
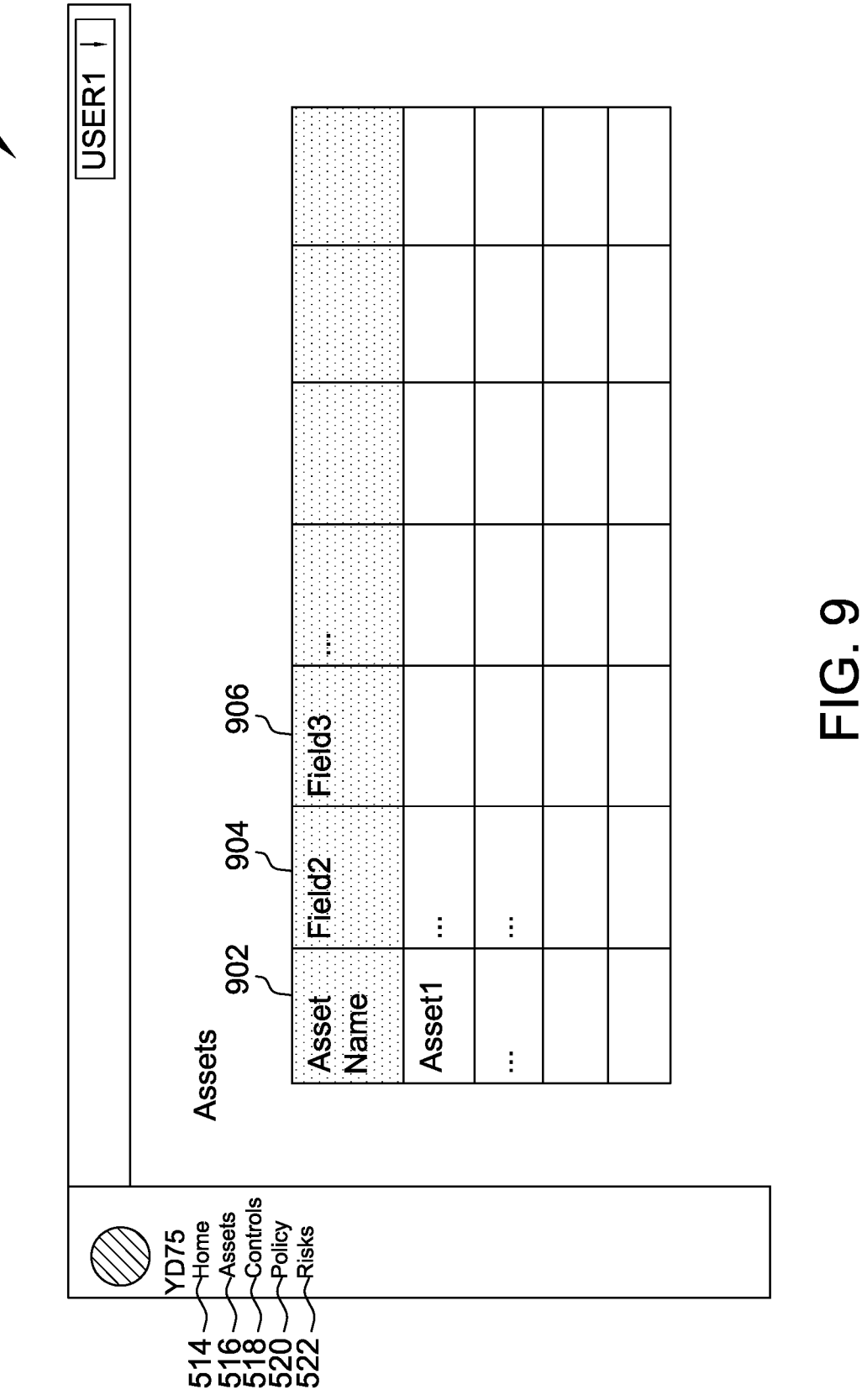
FIG. 9 illustrates an exemplary table view of an exemplary nodal network that may be generated by the computing system illustrated in FIG. 1.

In response to receiving data from at least one of data sources 110 and client computing device 108, NA computing device 102 is configured to generate nodal network map 500. Further, as displayed in FIG. 5, map 500 may be displayed on a graphical user interface (GUI) of, as an example, a client computing device (e.g., client computing device 108). The interface may include a plurality of user-selectable controls 512. Controls 512 may include a home page control 514, an asset control 516, a controls control 518, a policy control 520, and a data security control 522. In the example embodiment, in response to receiving an input at the GUI at one of controls 512, NA computing device 102 is configured to update the GUI to display information corresponding to the selected control. As examples, in response to selection of control 514 map 500 may be displayed, in response to selection of control 516 an asset table may be displayed (e.g., as shown in FIG. 9), in response to selection of control 518 a controls table may be displayed (e.g., displaying each control identified by NA computing device 102 and displayed in map 500), in response to selection of control 520 a policy table may be displayed (e.g., displaying each policy identified by NA computing device 102 and displayed in map 500), and in response to selection of control 522 a compliance table (e.g., displaying each data security rule identified by NA computing device 102 and displayed in map 500) may be displayed.

Further, the GUI may include display of a user profile control 534. For example, as shown in FIG. 5, a profile "USER1" is currently logged on (e.g., by entry of a username and/or password to NA computing device 102 via client computing device 108). In some embodiments, map 500 may correspond to a particular user profile. In other words, certain users may have access to different nodes 502-508 (e.g., for security purposes). Accordingly, in some embodiments NA computing device 102 is configured to cause display of only nodes 502-508 to which the active (e.g., logged in) user profile has access (e.g., some user profiles may be associated with asset owners, control owners, etc.). As an example, some users may have access to more or less nodes than other users. Accordingly, map 500 may include more or less nodes corresponding to the level of access of the user (e.g., defined in database 106).

In the example embodiment, display area 524 includes controls 526-532 corresponding to each node type. For example, as described below in greater detail, NA computing device 102 may determine (e.g., in response to inputs at client computing device 108) to display only a portion of nodes 502-508 and/or edges 510. Map 500 includes display of all nodes 502-508 and edges 510. Accordingly, controls 526-532 corresponding to each node type are animated in display area 524 (e.g., highlighted in a color corresponding to the color of each displayed node type-in some embodiments, controls 526-532, nodes 502-508, and/or edges 510 may be animated in any fashion (e.g., different patterns, shapes, etc.).

In the example embodiment, each of nodes 502-508 and edges 510 are selectable by a user. In response to receipt of an input corresponding to at least one node 502-508 and/or edge 510, NA computing device may cause display of more information regarding the selected node 502-508 and/or edge 510 in display area 524, as explained below in greater detail. Further, the selected node 502-508 and/or edge 510 may be animated such that a user viewing map 500 may distinguish which node 502-508 and/or edge 510 is currently selected.

Figure 6:
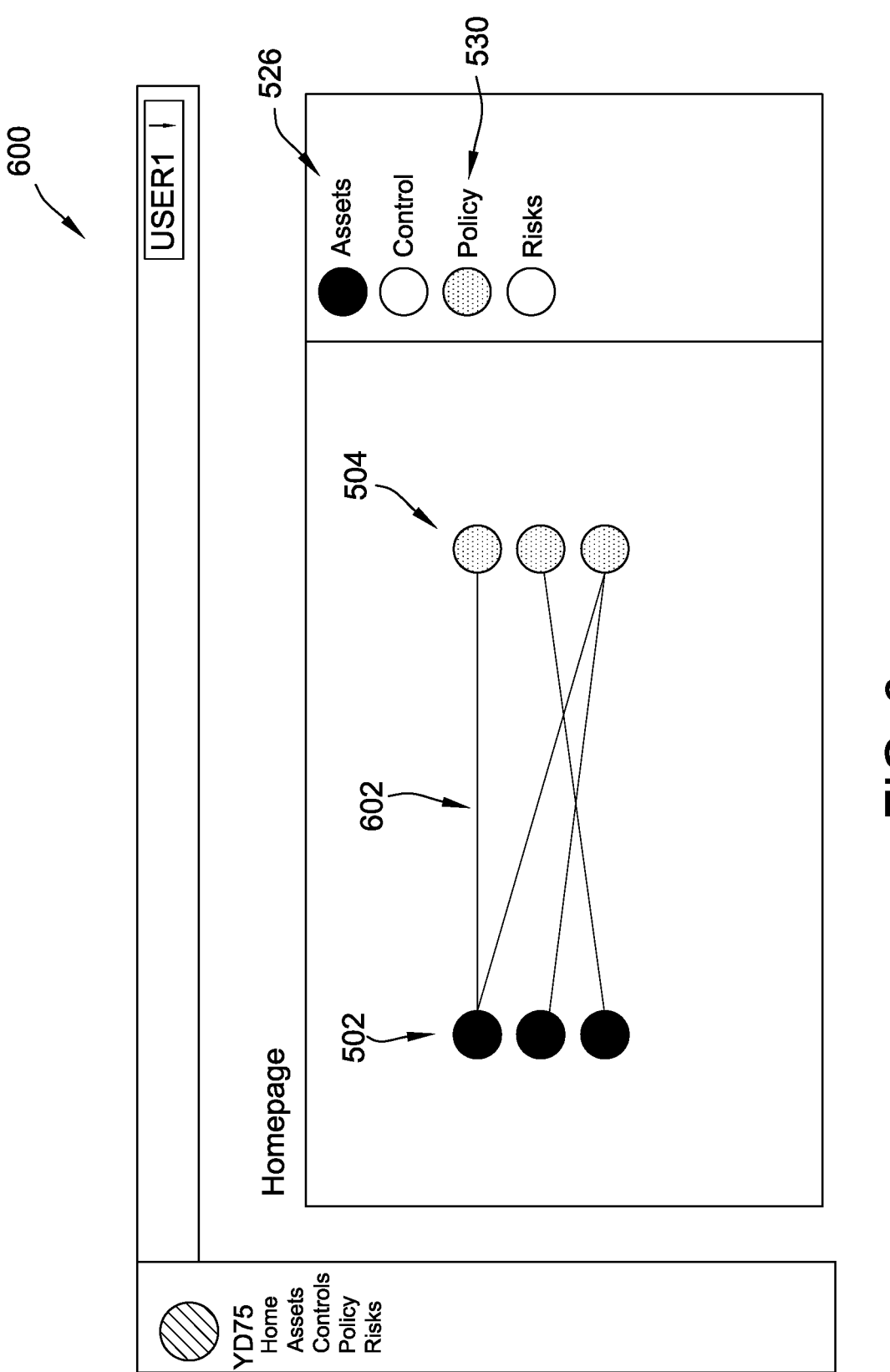
FIG. 6 illustrates another exemplary nodal network that may be generated by the computing system illustrated in FIG. 1.

FIG. 6 illustrates another exemplary nodal network map 600 that may be generated by NA computing device 102. In the example embodiment, map 600 may be generated and caused to be displayed on a GUI by NA computing device in response to a received input (e.g., at client computing device 108) corresponding to selection of node types corresponding to nodes 502 and 504 on map 500. Accordingly, only nodes 502, 504 and edges 602 (e.g., a portion of edges 510) are displayed in map 600. Further, in display area 524, only controls 526 and 530 are animated because controls 526 and 530 correspond to selected nodes 502 and 504. Map 600 further demonstrates one of the customizable aspects regarding personalized and simplified outputs provided by NA computing device 102.

Figure 7:
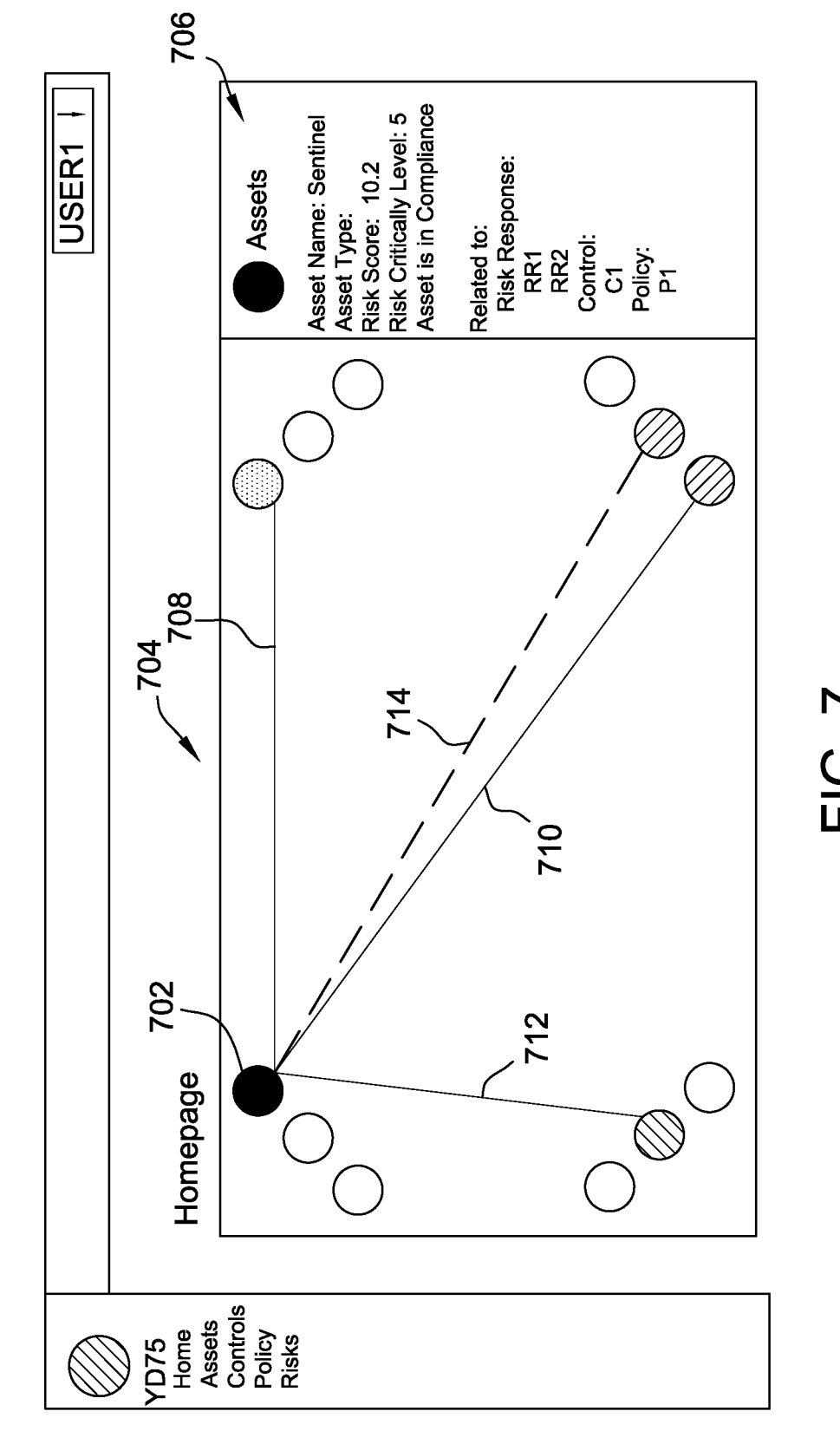
FIG. 7 illustrates an exemplary nodal network map displayed in response to receipt of an input by the computing system illustrated in FIG. 1.

FIG. 7 illustrates an exemplary nodal network map 700 displayed in response to receipt of an input by NA computing device 102. In the example embodiment, map 700 is generated and caused to be displayed by NA computing device 102 in response to a received input (e.g., at client computing device 108) such as a user selection of node 702 of nodes 502. Accordingly, node 702 is highlighted in map 700, along with each edge and node connected to node 702, in order to communicate to a user that node 702 has been selected. In the example embodiment, nodes and edges not connected to node 702 may be blurred or animated in a different fashion, as shown in FIG. 7.

Upon receipt of a user selection of node 702, NA computing device 102 further causes display of the asset type of the selected node 702 in display area 704 and eliminates display of non-selected node types (e.g., node types associated with nodes 704-708). In display area 706, NA computing device 102 causes display of the selected asset name, asset type, compliance score (e.g., corresponding to an amount of compliance and/or non-compliance), compliance critically level (e.g., how critical the asset is to system operation), an indication of whether or not the asset is in compliance (e.g., with system data security rules), and a listing of other nodes the selected node 702 is connected to/related to (e.g., in the example in FIG. 7, risk responses RR1 and RR2 (e.g., non-compliances), control C1, and Policy P1).

In some embodiments, compliance score is mainly determined via metadata that is pulled and caused to be displayed by NA computing device 102. NA computing device 102 determines the compliance score by a multitude of factors relating to the metadata of the record including such things as: asset criticality, other assets being dependent on the asset, how much and of what type of compliance the enterprise has with a given asset.

In some embodiments, metadata may be gathered/pulled by NA computing device 102 relating to suspect controls (CT) (e.g., controls yet to be implemented), implemented controls (IC), non-compliance (RR), standards, standard statements (SS), and policies.

CT data may include: CT ID, CT Name, Status, Owning Business Area, Control Tester Due Date, CT Evidence Provider Due Date, Created Date, Implemented Control, Tacking ID, Active, Date Inactivated, CT Program/Effort, RR ID, Control Tester, IC Description, Testing Completed Date, CT Reviewer, and Review Status.

IC data may include IC Name, IC ID, IC Status, Control Type, Owning Business Department, IC Description, CT Program/Effort, First published, Associated RR, Created By, Date Inactivated, Date Last CT Created, Date Last CT Completed, Has Open RR Records, Tracking ID, Enterprise Asset Category, Control Owner, IC Test Procedure/Objective, IC Program/Effort, Associated RR Records, and CT ID.

RR data may include: RR ID, Status, Title, RR Owner, RR Owner Management, RR Executive Ownership, Owning Business Area, Associated Records, RR Creator, Description, Root Cause Description, Completion Status, Days till Estimated Completion Date, Estimated Completion Date, and Initial Response Due.

Standards data may include: Standard Name, Standard ID, Business Area, Status, Standard Owner, Statement, Governance, Parent Policy, Standard Statement References, Associated RR, Associated IC, Last Reviewed, Next Review, and Tracking ID.

SS data may include: Standard Statement Name, Standard Statement ID, Standard Reference(s), Status, Standards (Standard Statement Released To), Associated RR, Associated Risk Assessment, Associated Source Sections, Associated Key Controls, Tracking ID, Associated Information Security and Privacy Review Board (ISPRB), and Standard Statement.

Policy data may include: Policy Name, Policy ID, Policy Owner, Status, Effective Date, Governing Area Leadership, Policy Purpose, Policy Scope, Area Reference(s), Audience, Policy Tracking ID, Published Date, Policy Date Created, Next Review Date, Last Review Date, Editors, Business Value, Business Area, Policy Last Updated, Governance, and Policy Statement.

In the example embodiment, NA computing device 102 may determine whether any threats are associated with nodes 502-508 and/or edges 510 (e.g., based upon analysis of and/or received data regarding each node and their respective relationships, as described herein). Upon user selection of a particular node 502-508 and/or edge 510, NA computing device 102 may animate nodes 502-508 and/or edges 510 in a way that communicates which nodes 502-508 and/or edges 510 have been determined to be associated with a potential threat (e.g., because of determined non-compliance with a data security protocol).

For example, in FIG. 7, a user has selected node 702. NA computing device 102, in this example, has determined that edges 708-712 (e.g., the relationships between nodes connected by edges 708-712) are not associated with a potential threat, while NA computing device 102 has determined that edge 714 is associated with a potential threat. Accordingly, edges 708-712 are displayed in a different manner (e.g., as the color green) than edge 714 (e.g., the color red). Edges not associated with a potential threat may be graphically displayed in any manner different form edges determined to be associated with a potential threat.

Figure 8:
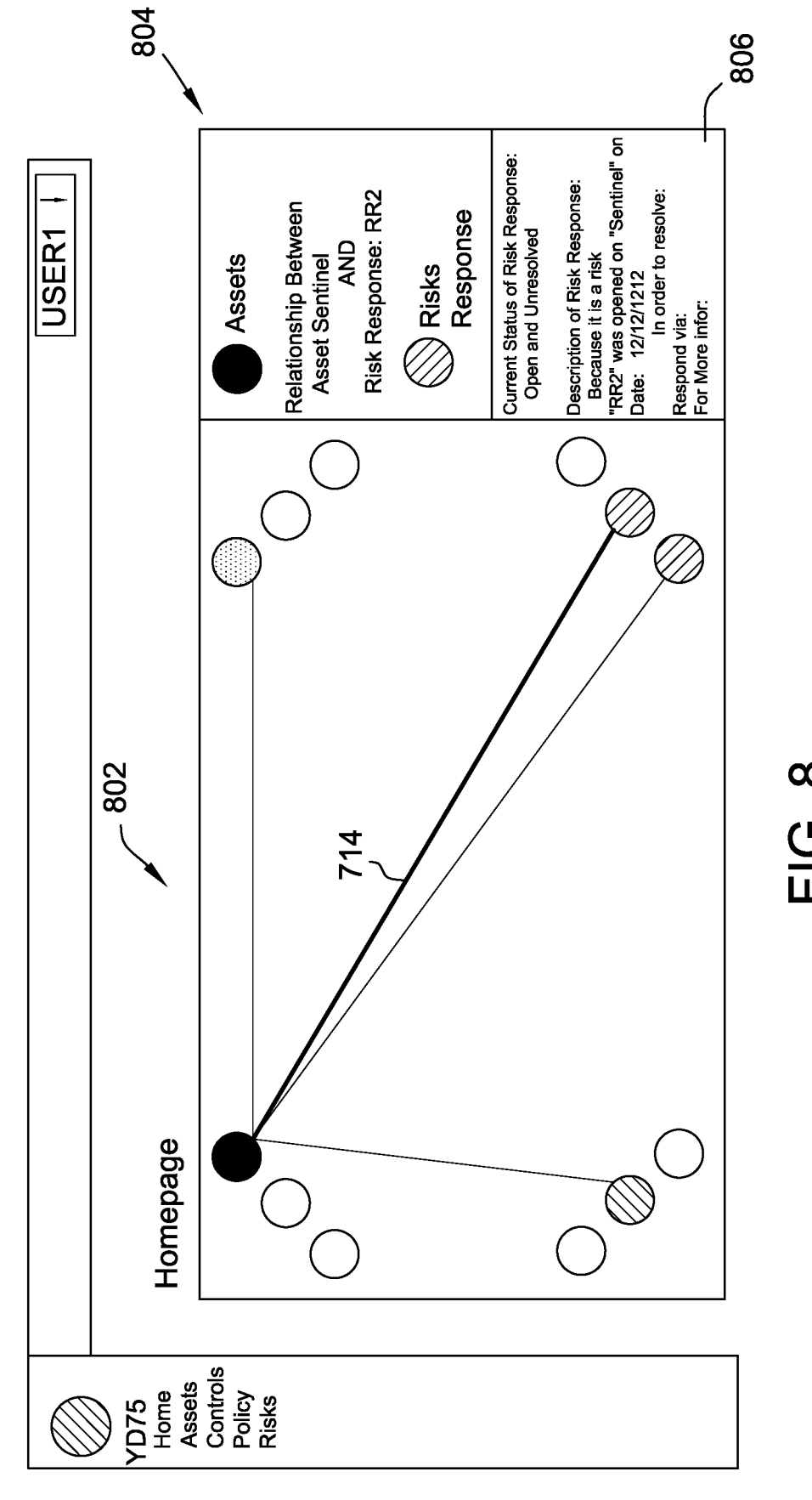
FIG. 8 illustrates another exemplary nodal network map displayed in response to receipt of an input by the computing system illustrated in FIG. 1.

FIG. 8 illustrates an exemplary nodal network map 800 displayed in response to receipt of an input by NA computing device 102. For example, map 800 may be displayed (e.g., as controlled by NA computing device 102) in response to user selection of edge 714 on map 700. Accordingly, NA computing device 102 causes display of details regarding the selected edge 714 in a first display area 802 (e.g., that the selected edge demonstrates a connection between asset: Sentinel and risk response: RR2). Further, in a second display area 804, NA computing device 102 causes display of at information regarding at least one potential solution to the identified threat (e.g., NA computing device 102 may have previously determined potential solutions for the selected threat (e.g., and stored the potential solutions in database 106) and retrieves the solution for display upon user selection of a particular edge).

Accordingly, as shown in display area 804, a threat status is displayed (e.g., opened/closed and/or resolved/unresolved), a threat description, a date the threat was identified, and at least one potential solution to the threat. In the example embodiment, potential solutions 806 to the selected threat are displayed as, for example, hyperlinks to software patches and/or to downloads for new versions of software as determined by NA computing device 102. In some embodiments, NA computing device 102 is configured to identify solutions 806 from a list of potential solutions (e.g., stored in database 106) that, if implemented, will bring the identified threat/non-compliance into compliance such that the threat/non-compliance no longer exists and data security protocols are satisfied. In some embodiments, NA computing device 102 may be configured to implement a solution 806 upon user selection of at least one solution. In some embodiments, NA computing device 102 may be configured to automatically implement at least one solution 806 to a threat upon determining the threat exists (e.g., without the need for user selection of a solution 806).

Exemplary Tabular Implementation of Nodal Network

FIG. 9 illustrates an exemplary table 900 displayed in response to an input by NA computing device 102. In the example embodiment, upon receipt of an input at NA computing device 102 (e.g., from a user at client computing device 108), NA computing device 102 may cause display of a different graphic. For example, in response to selection of home page control 514, NA computing device 102 may cause display of map 500. In response to selection of asset control 516, NA computing device 102 may cause display of table 900 corresponding to assets. Similarly, upon in response to selection of controls control 518, policy control 520, and/or data security control 522, NA computing device 102 may cause display of a controls table, a policy table, and/or a compliance table respectively (e.g., similarly formatted to table 900).

As shown in FIG. 9, table 900 is displayed in response to user selection of asset control 516. Table 900 includes a list 902 of one or more assets accessible by, in this example, USER1 (e.g., corresponding to each asset displayed as a node 502 in FIG. 5. Further, table 900 includes lists 904, 906, etc. corresponding to data regarding nodes 502 as stored in, as an example, database 106 and/or determined by NA computing device 102.

Data included in table 900 may include metadata may be gathered/pulled by NA computing device 102 relating to suspect controls (CT) (e.g., controls yet to be implemented), implemented controls (IC), non-compliance (RR), standards, standard statements (SS), and policies, as described above. In some embodiments, data may be gathered by device 102 from a plurality of sources 110. As one example, data may be pulled from a first source 110 (e.g., one or more Linux assets) including asset name, primary contact, patch level, and owning group. In some embodiments, data gathered may include a product name, IT costing id, manager; logical group and its name, IT costing id, asset criticality score, asset criticality tier, manager, and owner; workgroup and its name, asset owner, and organization code; Linux assets and its name, primary contact, patch level, and owning group. In some embodiments, gathered data may include product suites and its name, last seen, business process, IT costing id, and manager alias.

Accordingly, table 900 demonstrates another example of how NA computing device 102 is configured to analyze data from a plurality of data sources and configure a variety of outputs in order to better communicate information to a user (e.g., at client computing device 108). Further, table 900 demonstrates another example of how NA computing device 102 is configured to create relationships between information technology (IT) data, and present said relationships on an interactive user interface such that an end user is able to easily see what IT assets the end user is responsible for and whether those assets are in compliance with data security protocols, and if not, what steps need to be taken to achieve compliance.

Exemplary Computer-Implemented Method

FIG. 10 illustrates a flow chart of an exemplary computer-implemented method 1000 that may be carried out by NA computing device 102. Method 1000 may include connecting 1002 to a plurality of data sources (e.g., sources 110) in a nodal network including a plurality of nodes (e.g., nodes 502-508), wherein each data source of the plurality of data sources is associated with a node type of a plurality of node types (e.g., wherein the plurality of node types includes at least one of: assets, representing at least one computing device, policies, representing company policies, controls, representing data security controls, and data security protocols, representing defined data security protocols) and includes at least one node of the plurality of nodes and determining 1004, for each node of the plurality of nodes, a relationship (e.g., edges 510) to at least one other node of the plurality of nodes.

Method 1000 may also include generating 1006, based upon the determined relationships between nodes, a mapping (e.g., map 500) including each node of the plurality of nodes and each relationship of the determined relationships as an edge of a plurality of edges and analyzing 1008 each relationship of the determined relationships to determine at least one threat associated with at least one relationship of the determined relationships. Method 1000 may further include determining 1010 at least one solution for the at least one threat and causing display 1012 of the at least one threat and the at least one solution.

In some embodiments, method 1000 may include causing display of each node of the plurality of nodes and each edge of the plurality of edges, receiving an input indicating at least one of i) at least one node of the plurality of nodes and ii) at least one edge of the plurality of edges, and causing display of at least one non-compliance and at least one solution associated with the selection.

In some embodiments, method 1000 may include causing display of each node of the plurality of nodes and each edge of the plurality of edges and modifying display of each edge of the plurality of edges associated with the at least one threat in order to communicate at least one edge of the plurality of edges that is associated with the at least one threat.

In some embodiments, method 1000 may include determining at least one node of the plurality of nodes accessible by a user of the computing system based upon a security level associated with the user and causing display of only the at least one node accessible by the user and any threats associated therewith.

In some embodiments, method 1000 may include, in response to determining the at least one solution for the at least one threat, automatically implementing the at least one solution for the at least one threat.

In some embodiments, method 1000 may include, creating a first training set including a plurality of threats including the at least one threat, training a neural network in a first stage using the first training set, creating a second training set including the first training set and non-threats that are incorrectly identified as threats after the first stage of training, and training the neural network in a second stage using the second training set.

EXEMPLARY EMBODIMENTS &
FUNCTIONALITY

In one aspect, a computing system including a processor in communication with at least one memory may be provided. The processor may be configured to: (i) connect to a plurality of data sources in a nodal network including a plurality of nodes, wherein each data source of the plurality of data sources is associated with a node type of a plurality of node types (e.g., assets, representing at least one computing device, policies, representing company policies, controls, representing data security controls, and data security protocols, representing defined data security protocols) and includes at least one node of the plurality of nodes; (ii) determine, for each node of the plurality of nodes, a relationship to at least one other node of the plurality of nodes; (iii) generate, based upon the determined relationships between nodes, a mapping including each node of the plurality of nodes and each relationship of the determined relationships as an edge of a plurality of edges; (iv) analyze each relationship of the determined relationships to determine at least one threat associated with at least one relationship of the determined relationships; (v) determine at least one solution for the at least one threat; and/or (vi) cause display of the at least one threat and the at least one solution.

In some embodiments the processor may be further configured to: (i) cause display of each node of the plurality of nodes and each edge of the plurality of edges; (ii) receive an input indicating at least one of i) at least one node of the plurality of nodes and ii) at least one edge of the plurality of edges; and/or (iii) cause display of at least one non-compliance and at least one solution associated with the selection. In some embodiments the processor may be further configured to: (i) cause display of each node of the plurality of nodes and each edge of the plurality of edges; and/or (ii) modify display of each edge of the plurality of edges associated with the at least one threat in order to communicate at least one edge of the plurality of edges that is associated with the at least one threat.

In some embodiments the processor may be further configured to: (i) determine at least one node of the plurality of nodes accessible by a user of the computing system based upon a security level associated with the user; and/or (ii) cause display of only the at least one node accessible by the user and any threats associated therewith. In some embodiments the processor may be further configured to: (i) in response to determining the at least one solution for the at least one threat, automatically implement the at least one solution for the at least one threat.

In some embodiments the processor may be further configured to: (i) create a first training set including a plurality of threats including the at least one threat; (ii) train a neural network in a first stage using the first training set; (iii) create a second training set including the first training set and non-threats that are incorrectly identified as threats after the first stage of training; and/or (iv) train the neural network in a second stage using the second training set.

In another aspect, a computer-implemented method implemented by a computing system including a processor in communication with at least one memory may be provided. The method may include: (i) connecting to a plurality of data sources in a nodal network including a plurality of nodes, wherein each data source of the plurality of data sources is associated with a node type of a plurality of node types (e.g., assets, representing at least one computing device, policies, representing company policies, controls, representing data security controls, and data security protocols, representing defined data security protocols). and includes at least one node of the plurality of nodes; (ii) determining, for each node of the plurality of nodes, a relationship to at least one other node of the plurality of nodes; (iii) generating, based upon the determined relationships between nodes, a mapping including each node of the plurality of nodes and each relationship of the determined relationships as an edge of a plurality of edges; (iv) analyzing each relationship of the determined relationships to determine at least one threat associated with at least one relationship of the determined relationships; (v) determining at least one solution for the at least one threat; and/or (vi) causing display of the at least one threat and the at least one solution.

In some embodiments, the method may include: (i) causing display of each node of the plurality of nodes and each edge of the plurality of edges; (ii) receiving an input indicating at least one of i) at least one node of the plurality of nodes and ii) at least one edge of the plurality of edges; and/or (iii) causing display of at least one non-compliance and at least one solution associated with the selection. In some embodiments, the method may include: (i) causing display of each node of the plurality of nodes and each edge of the plurality of edges; and/or (ii) modifying display of each edge of the plurality of edges associated with the at least one threat in order to communicate at least one edge of the plurality of edges that is associated with the at least one threat.

In some embodiments, the method may include: (i) determining at least one node of the plurality of nodes accessible by a user of the computing system based upon a security level associated with the user; and/or (ii) causing display of only the at least one node accessible by the user and any threats associated therewith. In some embodiments, the method may include in response to determining the at least one solution for the at least one threat, automatically implementing the at least one solution for the at least one threat.

In some embodiments, the method may include: (i) creating a first training set including a plurality of threats including the at least one threat; (ii) training a neural network in a first stage using the first training set; (iii) creating a second training set including the first training set and non-threats that are incorrectly identified as threats after the first stage of training; and/or (iv) training the neural network in a second stage using the second training set.

In yet another aspect, at least one non-transitory computer-readable storage media having computer-executable instructions embodied thereon may be described. The instructions, when executed by a computing system including at least one processor in communication with at least one memory device, may cause the at least one processor to: (i) connect to a plurality of data sources in a nodal network including a plurality of nodes, wherein each data source of the plurality of data sources is associated with a node type of a plurality of node types and includes at least one node of the plurality of nodes; (ii) determine, for each node of the plurality of nodes, a relationship to at least one other node of the plurality of nodes; (iii) generate, based upon the determined relationships between nodes, a mapping including each node of the plurality of nodes and each relationship of the determined relationships as an edge of a plurality of edges; (iv) analyze each relationship of the determined relationships to determine at least one threat associated with at least one relationship of the determined relationships; (v) determine at least one solution for the at least one threat; and/or (vi) cause display of the at least one threat and the at least one solution.

In some embodiments, the instructions may further cause the processor to: (i) cause display of each node of the plurality of nodes and each edge of the plurality of edges; (ii) receive an input indicating at least one of i) at least one node of the plurality of nodes and ii) at least one edge of the plurality of edges; and/or (iii) cause display of at least one non-compliance and at least one solution associated with the selection. In some embodiments, the instructions may further cause the processor to: (i) cause display of each node of the plurality of nodes and each edge of the plurality of edges; and/or (ii) modify display of each edge of the plurality of edges associated with the at least one threat in order to communicate at least one edge of the plurality of edges that is associated with the at least one threat.

In some embodiments, the instructions may further cause the processor to: (i) determine at least one node of the plurality of nodes accessible by a user of the computing system based upon a security level associated with the user; and/or (ii) cause display of only the at least one node accessible by the user and any threats associated therewith. In some embodiments, the instructions may further cause the processor to, in response to determining the at least one solution for the at least one threat, automatically implement the at least one solution for the at least one threat.

In some embodiments, the instructions may further cause the processor to: (i) create a first training set including a plurality of threats including the at least one threat; (ii) train a neural network in a first stage using the first training set; (iii) create a second training set including the first training set and non-threats that are incorrectly identified as threats after the first stage of training; and/or (iv) train the neural network in a second stage using the second training set.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models (e.g., risk-identifying, solution-identifying, and solution-implementing models, which may be part of a single model or be separate models) may be created based upon example inputs in order to make valid and reliable predictions for novel inputs.

Additionally or alternatively, the machine learning programs may be trained by inputting sample data sets or certain data into the programs, such as threat/non-compliance data (e.g., corresponding to potential threats/non-compliance with data security protocols) and/or solution data (e.g., corresponding to potential solutions that, if implemented, would result in compliance with data security protocols). The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As an example, NA computing device 102 may implement artificial intelligence techniques in order to deploy a solution for a potential threat/non-compliance, analyze whether the deployed solution at least partially cured the potential threat/non-compliance, and generate a new data set for use in training a model as described above. As another example, a model may be trained over time such that when similar threats/non-compliances with data security protocols are identified across different enterprises, the model, being trained using data gathered from previously deployed solutions, may implement the solution that previously worked best in curing/removing the similar threats and bringing the enterprise network/system into compliance with data security protocols.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A data security protocol computing system configured to identify potential data security threats and deploy solutions to the potential data security threats, the data security protocol computing system comprising a processor in communication with at least one memory, the processor configured to:

connect to a plurality of data sources in a nodal network comprising a plurality of nodes, wherein each data source of the plurality of data sources is associated with a node type of a plurality of node types and comprises at least one node of the plurality of nodes;

determine, for each node of the plurality of nodes, a relationship to at least one other node of the plurality of nodes;

generate, based upon the determined relationships between nodes, a mapping including each node of the plurality of nodes and each relationship of the determined relationships as an edge of a plurality of edges;

cause a machine learning model to analyze each relationship of the determined relationships, wherein the machine learning model is trained in a plurality of stages, wherein each stage of the plurality of stages is associated with one or more training sets comprising at least one of previously-deployed solutions to threats, threats, or non-threats;

receive an output from the machine learning model comprising at least one data security threat associated with at least one node of the plurality of nodes, at least one edge of the plurality of edges between the at least one node and a different node of the plurality of nodes, and at least one data security solution, the at least one data security solution associated with the at least one data security threat and comprising at least one of a software patch or a new version of software;

cause display of the at least one edge in a first display format at a client computing device, the first display format associated with the at least one data security threat;

automatically implement the at least one data security solution based on the output from the machine learning model; and update display of the at least one edge at the client computing device from the first display format to a second display format, the second display format associated with the at least one data security solution being implemented.

2. The data security protocol computing system of claim 1, wherein the processor is further configured to:

cause display of each node of the plurality of nodes and each edge of the plurality of edges;

receive an input selecting at least one of i) the at least one node of the plurality of nodes and ii) the at least one edge of the plurality of edges; and cause display of at least one non-compliance and at least one solution associated with the input.

3. The data security protocol computing system of claim 1, wherein the processor is configured to:

cause display of each node of the plurality of nodes and each edge of the plurality of edges; and modify display of each edge of the plurality of edges associated with the at least one data security threat in order to communicate the at least one edge of the plurality of edges that is associated with the at least one data security threat.

4. The data security protocol computing system of claim 1, wherein the processor is further configured to:

determine one or more nodes of the plurality of nodes accessible by a user of the data security protocol computing system based upon a security level associated with the user; and cause display of only the one or more nodes accessible by the user and any threats associated therewith.

5. The data security protocol computing system of claim 1, wherein the machine learning model comprises a neural network, and wherein the processor is further configured to:

create a first training set of the one or more training sets comprising a plurality of threats including the at least one data security threat;

train the neural network in a first stage of the plurality of stages using the first training set;

create a second training set of the one or more training sets comprising the first training set and non-threats that are incorrectly identified as threats after the first stage of training; and train the neural network in a second stage of the plurality of stages using the second training set.

6. The data security protocol computing system of claim 1, wherein the plurality of node types includes at least one of: assets, representing at least one computing device, policies, representing company policies, controls, representing data security controls, and data security protocols, representing defined data security protocols.

7. The data security protocol computing system of claim 1, wherein the processor is further configured to cause display of the mapping including each node and each edge at the client computing device.

8. The data security protocol computing system of claim 7, wherein the processor is further configured to:

receive an input at the client computing device, the input selecting a node; and filter display of the mapping as including edges associated with the node and not other edges.

9. The data security protocol computing system of claim 8, wherein the processor is further configured to cause display of node data associated with the node based upon the input, the node data comprising at least one of an asset name associated with the node or an asset type associated with the node.

10. A computer-implemented method implemented by a computing system including a processor in communication with at least one memory, the method comprising:

connecting to a plurality of data sources in a nodal network comprising a plurality of nodes, wherein each data source of the plurality of data sources is associated with a node type of a plurality of node types and comprises at least one node of the plurality of nodes;

determining, for each node of the plurality of nodes, a relationship to at least one other node of the plurality of nodes;

generating, based upon the determined relationships between nodes, a mapping including each node of the plurality of nodes and each relationship of the determined relationships as an edge of a plurality of edges;

causing a machine learning model to analyze each relationship of the determined relationships, wherein the machine learning model is trained in a plurality of stages, wherein each stage of the plurality of stages is associated with one or more training sets comprising at least one of previously-deployed solutions to threats, threats, and non-threats;

receiving an output from the machine learning model comprising at least one data security threat associated with at least one node of the plurality of nodes, at least one edge of the plurality of edges between the at least one node and a different node of the plurality of nodes, and at least one data security solution, the at least one data security solution associated with the at least one data security threat and comprising at least one of a software patch or a new version of software;

causing display of the at least one edge in a first display format at a client computing device, the first display format associated with the at least one data security threat;

automatically implementing the at least one data security solution based on the output from the machine learning model; and updating display of the at least one edge at the client computing device from the first display format to a second display format, the second display format associated with the at least one data security solution being implemented.

11. The computer-implemented method of claim 8 further comprising:

causing display of each node of the plurality of nodes and each edge of the plurality of edges;

receiving an input selecting at least one of i) at least one node of the plurality of nodes and ii) the at least one edge of the plurality of edges; and causing display of at least one non-compliance and at least one solution associated with the input.

12. The computer-implemented method of claim 10, further comprising:

causing display of each node of the plurality of nodes and each edge of the plurality of edges; and modifying display of each edge of the plurality of edges associated with the at least one data security threat in order to communicate the at least one edge of the plurality of edges that is associated with the at least one data security threat.

13. The computer-implemented method of claim 10 further comprising:

determining one or more nodes of the plurality of nodes accessible by a user of the computing system based upon a security level associated with the user; and causing display of only the one or more nodes accessible by the user and any threats associated therewith.

14. The computer-implemented method of claim 10, wherein the machine learning model comprises a neural network, and wherein the method further comprises:

creating a first training set of the one or more training sets comprising a plurality of threats including the at least one data security threat;

training the neural network in a first stage of the plurality of stages using the first training set;

creating a second training set of the one or more training sets comprising the first training set and non-threats that are incorrectly identified as threats after the first stage of training; and training the neural network in a second stage of the plurality of stages using the second training set.

15. The computer-implemented method of claim 10, wherein the plurality of node types includes at least one of: assets, representing at least one computing device, policies, representing company policies, controls, representing data security controls, and data security protocols, representing defined data security protocols.

16. At least one non-transitory computer-readable storage media having computer-executable instructions embodied thereon, wherein when executed by a computing system including at least one processor in communication with at least one memory device, the computer-executable instructions cause the at least one processor to:

connect to a plurality of data sources in a nodal network comprising a plurality of nodes, wherein each data source of the plurality of data sources is associated with a node type of a plurality of node types and comprises at least one node of the plurality of nodes;

determine, for each node of the plurality of nodes, a relationship to at least one other node of the plurality of nodes;

generate, based upon the determined relationships between nodes, a mapping including each node of the plurality of nodes and each relationship of the determined relationships as an edge of a plurality of edges;

cause a machine learning model to analyze each relationship of the determined relationships, wherein the machine learning model is trained in a plurality of stages, wherein each stage of the plurality of stages is associated with one or more training sets comprising at least one of previously-deployed solutions to threats, threats, and non-threats;

receive an output from the machine learning model comprising at least one data security threat associated with at least one node of the plurality of nodes, at least one edge of the plurality of edges between the at least one node and a different node of the plurality of nodes, and at least one data security solution, the at least one data security solution associated with the at least one data security threat and comprising at least one of a software patch or a new version of software;

cause display of the at least one edge in a first display format at a client computing device, the first display format associated with the at least one data security threat;

automatically implement the at least one data security solution based on the output from the machine learning model; and update display of the at least one edge at the client computing device from the first display format to a second display format, the second display format associated with the at least one data security solution being implemented.

17. The at least one non-transitory computer-readable storage media of claim 16, wherein the computer-executable instructions further cause the processor to:

cause display of each node of the plurality of nodes and each edge of the plurality of edges;

receive an input selecting at least one of i) at least one node of the plurality of nodes and ii) the at least one edge of the plurality of edges; and cause display of at least one non-compliance and at least one solution associated with the input.

18. The at least one non-transitory computer-readable storage media of claim 16, wherein the computer-executable instructions further cause the processor to:

cause display of each node of the plurality of nodes and each edge of the plurality of edges; and modify display of each edge of the plurality of edges associated with the at least one data security threat in order to communicate the at least one edge of the plurality of edges that is associated with the at least one data security threat.

19. The at least one non-transitory computer-readable storage media of claim 16, wherein the computer-executable instructions further cause the processor to:

determine one or more nodes of the plurality of nodes accessible by a user of the computing system based upon a security level associated with the user; and cause display of only the one or more nodes accessible by the user and any threats associated therewith.

20. The at least one non-transitory computer-readable storage media of claim 16, wherein the machine learning model comprises a neural network, and wherein the computer-executable instructions further cause the processor to:

create a first training set of the one or more training sets comprising a plurality of threats including the at least one data security threat;

train the neural network in a first stage of the plurality of stages using the first training set;

create a second training set of the one or more training sets comprising the first training set and non-threats that are incorrectly identified as threats after the first stage of training; and train the neural network in a second stage of the plurality of stages using the second training set.

* * * * *